(12) United States Patent
Xu

(10) Patent No.: US 11,012,484 B2
(45) Date of Patent: May 18, 2021

(54) AUDIO DATA COMMUNICATION SYSTEM

(71) Applicant: ZGMICRO NANJING LTD, Jiangsu (CN)

(72) Inventor: Bin Xu, Jiangsu (CN)

(73) Assignee: ZGMICRO NANJING LTD, Nanjing (CN)

( * ) Notice: Subject to any disclaimer, the term of this patent is extended or adjusted under 35 U.S.C. 154(b) by 49 days.

(21) Appl. No.: 16/704,652

(22) Filed: Dec. 5, 2019

(65) Prior Publication Data

US 2020/0213377 A1  Jul. 2, 2020

(51) Int. Cl.
*H04L 29/06* (2006.01)
*H04L 1/00* (2006.01)
*H04L 12/18* (2006.01)

(52) U.S. Cl.
CPC .......... *H04L 65/601* (2013.01); *H04L 1/0045* (2013.01); *H04L 1/0061* (2013.01); *H04L 12/18* (2013.01); *H04L 65/4076* (2013.01)

(58) Field of Classification Search
CPC . H04L 65/601; H04L 65/4076; H04L 1/0045; H04L 1/0061; H04L 12/18; H04L 12/1881; H04L 12/1877; H04L 1/08; H04L 2001/0097; H04L 65/608; H04L 1/0036; H04L 65/60; H04L 1/004; H04W 4/80; H04W 88/04; H04W 4/06; H04H 20/16
See application file for complete search history.

(56) References Cited

U.S. PATENT DOCUMENTS

| | | | | |
|---|---|---|---|---|
| 2010/0027719 | A1* | 2/2010 | Pahuja | H04L 27/10 375/340 |
| 2012/0171958 | A1* | 7/2012 | Cornett | H04L 63/08 455/41.2 |
| 2013/0039303 | A1* | 2/2013 | Stadelmeier | H04L 5/0044 370/329 |

* cited by examiner

*Primary Examiner* — Afshawn M Towfighi
(74) *Attorney, Agent, or Firm* — Joe Zheng

(57) ABSTRACT

Techniques for broadcasting audio data from one device to multiple devices are described. A sound source device is configured for broadcasting audio data on a plurality of first time blocks in a first broadcast interval, and, one or more receiving and forwarding devices are configured for receiving the audio data from the sound source device and/or other receiving and forwarding devices on one or more second time blocks in a second broadcast interval, where the receiving and forwarding devices forward the audio data on one or more third time blocks in the second broadcast interval after the audio data packet is received correctly. The first broadcast interval is synchronously aligned with the second broadcast interval, and the aligned first and second broadcast intervals are used to transmit the same audio data. Thereby, reliable audio data communication from one point to multiple points can be realized.

10 Claims, 4 Drawing Sheets

AUDIO DATA COMMUNICATION SYSTEM

BACKGROUND OF THE INVENTION

Field of the Invention

The present application relates to the field of communications, in particular, to method and system for audio data sharing or broadcasting.

Description of the Related Art

With rapid development of radio-frequency wireless connection technologies, such as Bluetooth and WiFi, sharing audio wirelessly has become part of life. For example, WiFi smart speakers centered on routers and Bluetooth smart speakers or smart headphones centered on smart phones bring great convenience for people to share audio. However, network topology and communication distance of Bluetooth and WiFi limit more and more extensive needs. For example, point-to-multipoint wireless broadcasting can realize a function of sharing audio without dead space in multiple rooms. Although the point-to-multipoint wireless broadcasting can be realized by technologies of Bluetooth's CSB (connectionless slave broadcast) and low power Bluetooth BIS (broadcast synchronous stream), the CSB and the BIS are easily affected by occlusion and interference, and the number of retransmissions is limited. Therefore, it is difficult to achieve reliable communication.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention The present invention is generally related to architecture and designs of audio data broadcasting or communication system. According to one aspect of the present invention, various techniques are provided for ensuring reliable communication from one point to multiple points. An audio data communication system comprises: a sound source device configured for broadcasting an audio data packet on a plurality of first time blocks in a first broadcast interval; and one or more receiving and forwarding devices configured for receiving the audio data packet broadcasted by the sound source device and/or other receiving and forwarding devices on one or more second time blocks in a second broadcast interval, and forwarding the audio data packet on one or more third time blocks in the second broadcast interval after the audio data packet is received correctly. The first broadcast interval is synchronously aligned with the second broadcast interval, and the aligned first and second broadcast intervals are used to transmit the same audio data packet.

According to another aspect of the present invention, the sound source device transmits the audio data multiple times in the broadcast interval to improve reliability of receiving the audio data by the receiving device. The receiving and forwarding device also forward the audio data multiple times in the same broadcast interval after the audio data is received correctly, so that other blocked receiving and forwarding devices or receiving devices that cannot reliably receive the broadcast audio data can receive the audio data reliably, thereby improving the reliability of receiving the audio data by the receiving device in the audio communication system, or reducing dead space of the audio communication system.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF THE PREFERRED EMBODIMENTS

The detailed description of the invention is presented largely in terms of procedures, operations, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be comprised in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Frequency diversity and spatial diversity are the most effective methods to solve the occlusion fading and interference. CSB (connectionless slave broadcast) and BIS (broadcast synchronous stream) can realize the frequency diversity by multiple frequency hopping broadcasting, but lacks the means of the spatial diversity. Therefore, the present application provides an audio communication system that can realize the spatial diversity based on multi-point cooperation.

Figure 1:
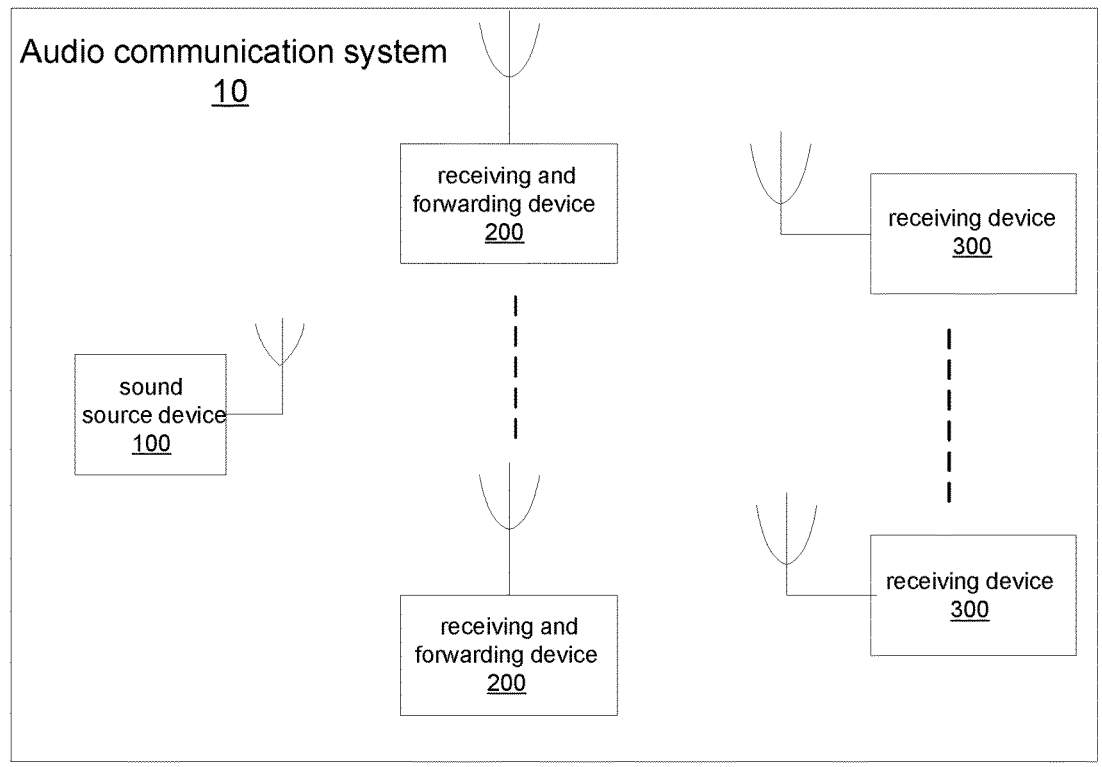
FIG. 1 is a schematic diagram of an audio communication system according to one embodiment of the present application.

FIG. 1 shows a schematic diagram of an audio communication system 10 according to one embodiment of the present application. As shown in FIG. 1, the audio communication system 10 according to one embodiment of the present application includes a sound source device 100, one or more receiving and forwarding devices 200, and zero, one or more receiving devices 300. The sound source device 100 is configured to broadcast and transmit an audio data packet on a plurality of first time blocks in a first broadcast interval.

Figure 2:
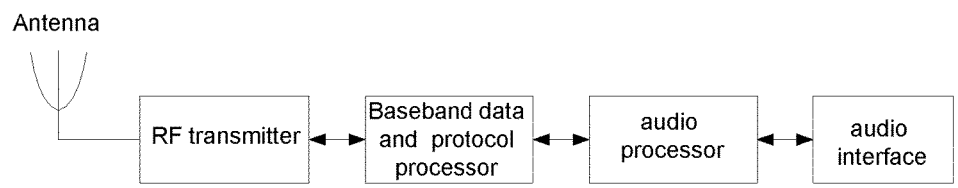
FIG. 2 is a schematic diagram of a sound source device according to one embodiment of the present application.

FIG. 2 is a block diagram of a sound source device according to one embodiment of the present application. As shown in FIG. 2, the sound source device includes an antenna, a radio frequency transmitter, a baseband data and protocol processor, an audio processor, and an audio source interface. The sound source device obtains audio data through the sound source interface. The audio interface may be a USB interface, an SD card, a wireless connection, or the like. The audio data is encoded by the audio processor into a plurality of frames of audio data suitable for wireless broadcasting. The frames of audio data are sent to the baseband data and protocol processor. The baseband data and protocol processor encapsulates the frames of audio data into a data format suitable for wireless broadcasting. The radio frequency transmitter modulates the data format of audio data into a radio frequency (RF) signal. The antenna broadcasts the RF signal on a plurality of first time blocks in the first broadcast interval.

In one embodiment, the first broadcast interval may include a plurality of first time blocks for broadcasting the audio data packet. The plurality of first time blocks includes one broadcast anchor time block for broadcasting one audio data packet and N broadcast retransmission time blocks for retransmitting the one audio data packet. N is a positive integer.

Figure 3:
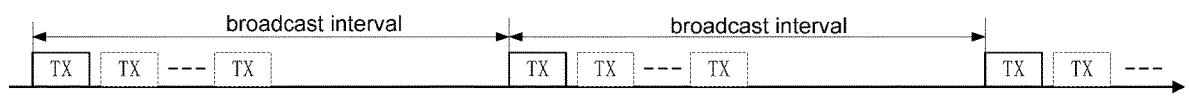
FIG. 3 is a diagram showing a broadcast time slot structure of the sound source device according to one embodiment of the present application.

Specifically, the first broadcast interval may adopt a broadcast time slot structure as shown in FIG. 3. As shown in FIG. 3, the sound source device encodes the audio data into a plurality of frames of audio data at a fixed interval, and encapsulates the one or more frames of audio data into an audio data packet in a fixed length. The first broadcast interval is set to be L times of the fixed interval, and L is a positive integer. Thus, the playback time of the audio data packet is equal to the broadcast interval in the broadcast time slot structure shown in FIG. 3. The same audio data packet is sent multiple times in each broadcast interval. As shown in FIG. 3, the time in the broadcast interval is divided into a plurality of time blocks. The TX block in a solid line is the broadcast anchor time block, and the TX block in a broken line is the broadcast retransmission time block.

The blank space in the broadcast interval shown in FIG. 3 may be used as a fourth time block for receiving audio data packets from other devices; and/or transmitting synchronization information for synchronously aligning the first broadcast interval and the second broadcast interval.

The one or more receiving and forwarding devices 200 are configured to receive audio data packets transmitted by the sound source device and/or other receiving and forwarding devices on one or second time blocks in a second broadcast interval; and forward the audio data packets on one or more third time blocks in the second broadcast interval after the audio data packet is received correctly. The first broadcast interval and the second broadcast interval are synchronously aligned. The aligned first and second broadcast intervals are used to transmit the same audio data packet.

Figure 4:
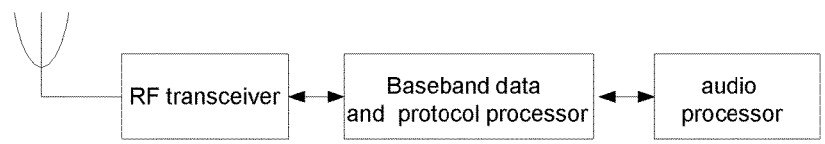
FIG. 4 is a schematic diagram of a receiving and forwarding device according to one embodiment of the present application.

FIG. 4 is a diagram of a receiving and forwarding device according to one embodiment of the present application. As shown in FIG. 4, the receiving and forwarding device includes an antenna, a radio frequency transceiver, a baseband data and protocol processor, and an audio processor. The receiving and forwarding device receives the broadcast signal via the antenna, demodulates the broadcast signal into baseband data through the radio frequency transceiver, and then recovers the audio data through the baseband data and the protocol processor, and finally sends the audio data to the audio processor for further processing and playback. Further processing of the audio data includes packet loss compensation. The receiving and forwarding device also modulates the audio data received correctly into a radio frequency signal through the radio frequency transceiver, and then forwards the radio frequency signal to other receiving and forwarding devices or the receiving devices through the antenna.

In one embodiment, the baseband data and protocol processor of the receiving and forwarding device 200 include a first receiving module configured to receive the audio data packet sent by the sound source device and/or other receiving and forwarding devices on the one or more second time blocks in the second broadcast interval; a first CRC check module configured to perform a cyclic redundancy check CRC on the received audio data packet; a sending module configured to forward the audio data packet on the one or more third time blocks in the second broadcast interval; and a first determining module configured to inform the first receiving module to continue or stop receiving the audio data packet in the second broadcast interval according to a result of the CRC, the number of reception times of the audio data packet, the number of the second time block and the number of the third time block; or inform the sending module to forward the audio data packet.

In one embodiment, the first determining module is configured for informing the first receiving module to stop receiving the audio data packet in the second broadcast interval if the result of the CRC of the audio data packet is correct, increasing the number of used time block by one, determining whether the number of used time blocks is equal to M, and informing the sending module to forward the audio data packet on the one or more three time blocks in the second broadcast interval if the number of used time blocks is not equal to M, wherein M is the sum of the number of the second time blocks and the number of the third time blocks. The first determining module is further configured for increasing the number of reception times of the audio data packet if the result of the CRC of the audio data packet is incorrect, determining whether the number of reception times of the audio data packet is equal to M, informing the first receiving module to continue receiving the audio data packet in the second broadcast interval when the number of reception times is not equal to M, and informing the first receiving module to stop receiving the audio data packet in the second broadcast interval when the number of reception times is equal to M. Specifically, M is an integer of 6, 8, 10 or the like.

In one embodiment, the second broadcast interval may include: one or more second time blocks for receiving an audio data packet; and one or more third time blocks for forwarding the audio data packet after the audio data packet is received correctly. The sum of the second time block and the third time block is less than or equal to the second broadcast interval. In one embodiment, the second broadcast interval used by the receiving and forwarding device may adopt a broadcast time slot structure as shown in FIG. 5 to receive and transmit data.

Figure 5:
FIG. 5 is a schematic diagram showing a broadcast time slot structure of the receiving and forwarding device according to one embodiment of the present application.

As shown in FIG. 5, the receiving and forwarding device receives the broadcast data in the broadcast anchor time block. The receiving and forwarding device continues receiving the audio data packet in the retransmission time block if the audio data packet is received incorrectly. If the audio data packet is received correctly, the received audio data packet is forwarded in a subsequent time block. The audio data packet forwarded by the receiving and forwarding device is the same as the audio data packet sent by the sound source device, that is, the same channel frequency, the same modulation mode, the same packet structure, and the same transmission time (within the aligned broadcast intervals).

Zero, one or more receiving devices 300 is configured for receiving the audio data packets transmitted by the sound source device and/or other receiving and forwarding devices on one or more fifth time blocks in a third broadcast interval. The first broadcast interval is aligned with the third broadcast interval. The aligned first and third broadcast intervals are used to transmit the same audio data packet.

Figure 6:
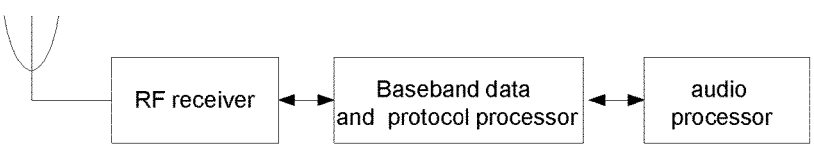
FIG. 6 is a schematic diagram of a receiving device according to one embodiment of the present application.

FIG. 6 is a diagram of the receiving device according to one embodiment of the present application. As shown in FIG. 6, the receiving device may include: an antenna, a radio frequency receiver, a baseband data and protocol processor and an audio processor. The receiving device receives the broadcast signal through the antenna, demodulates the broadcast signal into baseband data through the radio frequency receiver, and then recovers the audio data through the baseband data and protocol processor, and finally sends the audio data to the audio processor for further processing and playback. Further processing of the audio data includes packet loss compensation.

In one embodiment, the baseband data and protocol processor of the receiving device 300 may include: a second receiving module, configured to receive the audio data packet sent by the sound source device and/or other receiving and forwarding devices on one or more fifth time blocks in the third broadcast interval; a second CRC check module, configured to perform a cyclic redundancy check CRC on the received audio data packet; a second determining module is configured to inform the second receiving module to continue or stop receiving the audio data packet in the third broadcast interval according to a result of the CRC and the number of reception times of the audio data packet and the number of the fifth time blocks.

In one embodiment, the second determining module is configured for: informing the second receiving module to stop receiving the audio data packet in the third broadcast interval when the result of the CRC of the audio data packet is correct; accumulating the number of reception times of the audio data packet by one when the result of the CRC of the audio data packet is incorrect; determining whether the number of reception times of the audio data packet is equal to P, informing the third receiving module to continue receiving the audio data packet in the third broadcast interval when the number of reception times is not equal to P, and informing the first receiving module to stop receiving the audio data packet in the third broadcast interval when the number of receiving times is equal to P. P is the number of the fifth time blocks in the third broadcast interval Specifically, P may be 6 or 8, or the like.

In short, in the embodiment of the present application, the sound source device obtains audio data through a wireless, wired or local storage unit, encodes the audio data into a plurality of frames of audio data at the fixed intervals, encapsulates the frames of audio data into one or more audio data packets, and wirelessly broadcast the audio data packets to the receiving and forwarding device, or the receiving device in a predetermined time slot. After the audio data broadcasted or forwarded by the source device or other receiving and forwarding device is received correctly by one receiving and forwarding device, the received audio data is forwarded in a predetermined time slot to other receiving and forwarding devices or the receiving devices by the one receiving and forwarding device In the audio communication system according to one embodiment of the present application, the sound source device transmits the audio data multiple times in the broadcast interval to improve reliability of receiving the audio data by the receiving device. The receiving and forwarding device also forward the audio data multiple times in the same broadcast interval after the audio data is received correctly, so that other blocked receiving and forwarding devices or receiving devices that cannot reliably receive the broadcast audio data can receive the audio data reliably, thereby improving the reliability of receiving the audio data by the receiving device in the audio communication system, or reducing dead space of the audio communication system.

The audio communication system according to one embodiment of the present invention includes a wireless broadcast sound source device, one or more wireless broadcast receiving and forwarding devices, and zero or more wireless broadcast receiving devices.

The wireless broadcast sound source device includes an antenna, a radio frequency transmitter, a baseband data and protocol processor, an audio processor, and an audio source interface. The audio source interface is a Bluetooth module which is used to obtain audio data from a Bluetooth device such as a smart phone through a Bluetooth connection. In this embodiment, the antenna, the radio frequency transmitter, the baseband data and the protocol processor, and the audio processor of the audio communication system are shared with the Bluetooth communication system. That is, the antenna, the radio frequency transmitter, the baseband data and protocol processor, and the audio processor of the audio communication system respectively correspond to the antenna, the radio frequency transmitter, the baseband data and protocol processor, and the audio processor of the Bluetooth module. The audio processor implements functions such as audio encoding, audio decoding, and packet loss compensation. These modules are shared between the radio broadcast function and the Bluetooth connection in a time-multiplexed manner.

The broadcast time slot structure of the wireless broadcast sound source device is as shown in FIG. 3, and the broadcast interval is 30 ms. According to the Bluetooth time slot definition method, each broadcast interval is divided into 48 time slots each time slot being 625 us. 12 time slots of 48 time slots or 7.5 ms is used for wireless broadcasting. 36 time slots of 48 time slots or 22.5 ms is used for the Bluetooth module as the sound source interface to obtain the audio data from the smart phone, or sending broadcast synchronization information, or other functions. The broadcast synchronization information can use a Sync Train liked CSB (Connectionless Slave Broadcast).

After the wireless broadcast sound source device obtains the audio data through the Bluetooth connection, the audio data is re-encoded by the audio processor using an Opus Codec. An encoding rate is about 100 kbps, a length of one frame of encoded audio data is 10 ms, each frame has about 125 bytes, and each three frames of encoded audio data form one data packet, about 375 bytes. Classic 2DH3 packet type with extended length in Bluetooth is used, and each 2DH3 packet occupies 4 time slots. Three time slots of the 4 time slots is configured for transmitting the encoded audio data, and one time slot of the 4 time slots is idle. As shown in FIG. 3, the 2DH3 packet is transmitted 3 times in each broadcast interval repeatedly, and occupies a total of 12 time slots.

When the wireless broadcast sound source device transmits the 2DH3 packet, a channel for transmitting the 2DH3 packet is obtained by adding a fixed channel offset 30 on a channel selected by a Bluetooth frequency hopping method and considering a total number of channels 79. For example, if the channel selected by the Bluetooth frequency hopping mode is 10, then the channel for transmitting the 2DH3 packet is 40 (namely, 10+30=40). If the channel selected by the Bluetooth frequency hopping method is 60, and the channel for transmitting the 2DH3 packet is 11 (namely, 60+30−79=11).

The wireless broadcast sound source device encapsulates three frames of encoded audio data into one 2DH3 packet through the baseband data and protocol processor and sends the 2DH3 packet to the radio frequency transmitter. The channel of the radio frequency transmitter is set according to the above method. The radio frequency transmitter modulates the 2DH3 packet into a radio frequency signal on the selected channel, and transmits the radio frequency signal to the radio broadcast receiving and forwarding device or the radio broadcast receiving device through the antenna.

The radio broadcast receiving and forwarding device includes an antenna, a radio frequency transceiver, a baseband data and protocol processor, and an audio processor. In this embodiment, an antenna, a Bluetooth radio transceiver, a Bluetooth baseband data and protocol processor of the Bluetooth device are adopted. The radio broadcast receiving and forwarding device sets the same receiving time and the same receiving channel as the time slot of the radio broadcast sound source device according to the synchronization information sent by the radio broadcast sound source device, receives the radio frequency signal broadcasted by the radio broadcast sound source device through the antenna, demodulate the radio frequency signal into baseband data through the radio transceiver, determine whether the 2DH3 packet is received correctly by checking a synchronization word and a CRC through the baseband data and the protocol processor, extracts the audio load data from the 2DH3 packet with a correct result of the CRC. On the one hand, the audio load data is provided to the audio processor for decoding, further processing and playback. Further processing of the audio data includes packet loss compensation. On the other hand, the audio load data is repackaged into a new 2DH3 packet by the baseband data and protocol processor, is modulated into the radio frequency signal on the channel of corresponding time slot by the radio frequency transceiver, and is transmitted by the antenna.

The broadcast time slot structure of the radio broadcast receiving and forwarding device is as shown in FIG. 5. The 48 time slots in the broadcast interval are divided into a receiving time domain, a transmitting time domain, and other time domains. The time slots of the receiving time domain and the transmitting time domain are divided into a plurality of time blocks each comprising 4 time slots, and each time block is configured to receive or transmit one 2DH3 packet. The sum of the receiving time domain and the transmitting time domain comprises at most 12 time blocks, that is, 48 time slots of the broadcast interval. The receiving time domain and the transmitting time domain actually used by each radio broadcast receiving and forwarding device may comprise different number of time slots. In one embodiment, the sum of the receiving time domain and the transmitting time domain is set to comprise 8 time blocks, that is, 32 time slots. The remaining 3 time blocks, that is, 12 time slots, are used for other functions, such as transmitting and receiving synchronization information.

In this embodiment, regarding to the 8 time blocks, a division or a size of the receiving time domain and the transmitting time domain is depended on the broadcast receiving performance. The receiving time domain includes at least one receiving time block, and includes at most 8 time blocks. That is, at least one receiving time block is configured for receiving audio data broadcasted by the wireless broadcast sound source device. The transmitting time domain has at most 7 time blocks and at least 0 time blocks. In the first time block of each broadcast interval, the radio broadcast receiving and forwarding device receives the audio data broadcasted by the radio broadcast sound source device, and switches to the transmitting time domain in the next time block if the 2DH3 packet is received correctly. Otherwise, the same audio data that is simultaneously transmitted in the same channel by the radio broadcast sound source devices or other radio broadcast receiving and forwarding devices at different locations, continues to be received in the next time block.

Figure 7:
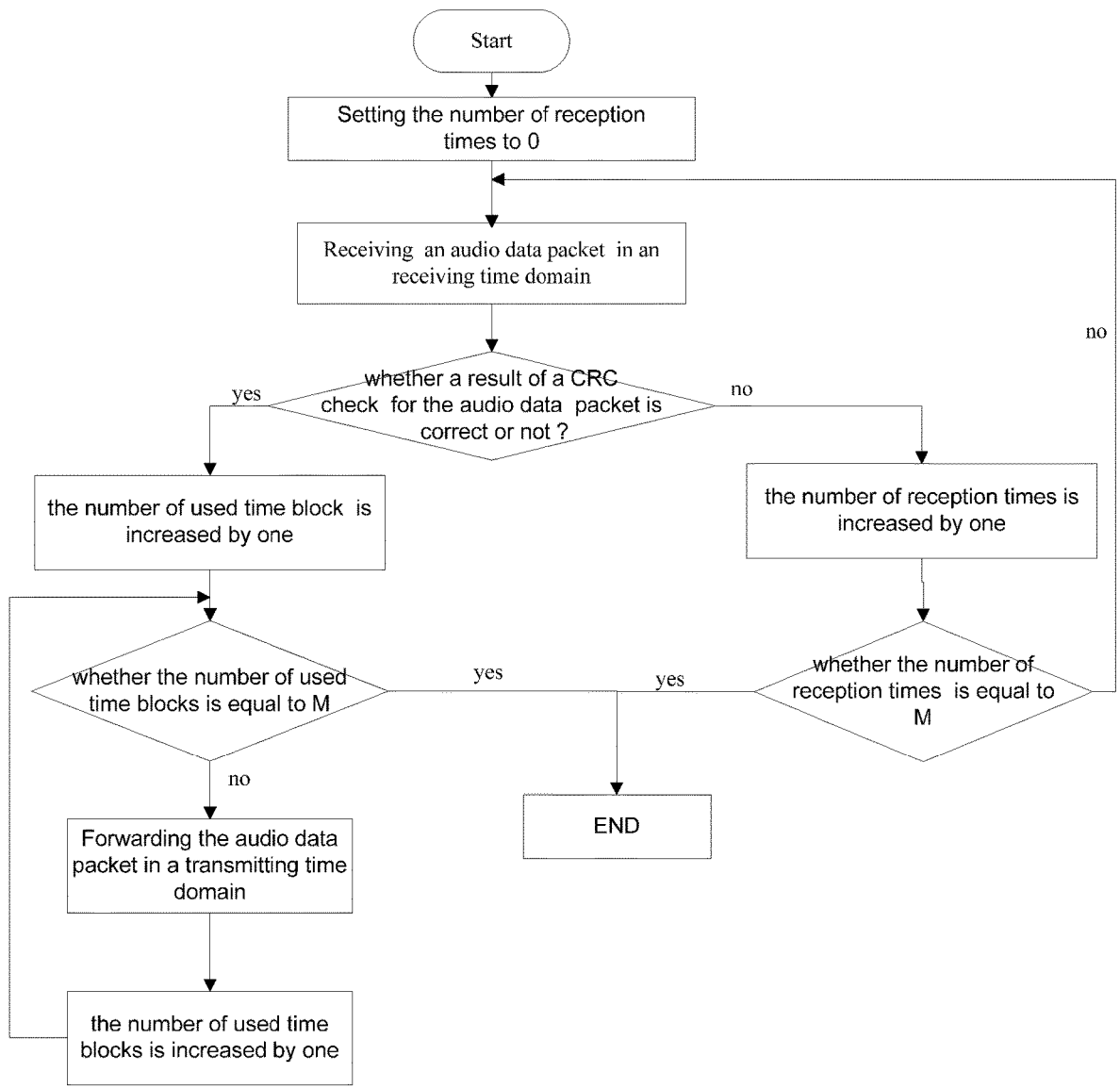
FIG. 7 is a receiving and forwarding flowchart of the receiving and forwarding device in one broadcast interval according to one embodiment of the present application.

The receiving and forwarding process of the radio broadcast receiving and forwarding device in one broadcast interval is as shown in FIG. 7. The number of reception times is set to 0 at an anchor point of the broadcast interval, and then the broadcasted data transmitted by the wireless broadcast sound source device is sequentially received in the first time block. A CRC is performed on the received audio data. If the result of the CRC is correct, the receiving of the audio data in the broadcast interval is stopped and the received audio data is sent to the audio processor. If the number of used time blocks (including the used receiving time block and the used transmitting time block) is less than the total number of receiving and transmitting time blocks (M) after the audio data is received correctly, the received audio data is forwarded in the transmitting time domain until the number of used time blocks is equal to M and the transmission is ended. If the sync word is incorrect or the result of the CRC is incorrect, the receiving of the audio data in the broadcast interval is continued in the next time block. If the number of reception times is equal to the total number of the time blocks (M), the receiving in the broadcast interval is ended, and the packet loss information is sent to the audio processor.

The wireless broadcast receiving device may include an antenna, a radio frequency receiver, a baseband data and protocol processor, and an audio processor. In this embodiment, an antenna, a Bluetooth radio transceiver, a Bluetooth baseband data and protocol processor of a Bluetooth device are adopted. The wireless broadcast receiving device sets the same receiving time and the same receiving channel as the time slot structure of the wireless broadcast sound source device based on the synchronization information sent by the wireless broadcast sound source device, receives the radio frequency signal broadcasted by the wireless broadcast sound source device or the wireless broadcast receiving and forwarding devices through the antenna, demodulate the radio frequency signal into baseband data through the radio frequency receiver, determine whether the 2DH3 packet is received correctly by checking a synchronization word and a CRC through the baseband data and the protocol processor, extracts the audio load data from the 2DH3 packet with a correct result of the CRC. The audio payload data is provided to the audio processor for decoding, further processing and playback. Further processing of the audio includes packet loss compensation.

The 48 time slots in the broadcast interval are divided into a receiving time domain and other time domains. The time slots of the receiving time domain are divided into a plurality of time blocks each comprising 4 time slots, and each time block receives one 2DH3 packet. The receiving time domain comprises at most 12 time blocks, that is, 48 time slots of the broadcast interval. The receiving time domain actually used by each radio broadcast receiving device may have different number of time slots. In the present embodiment, the receiving time domain is set to 8 time blocks, that is, 32 time slots. The remaining 3 time blocks, that is, 12 time slots, are used for other functions, such as receiving synchronization information.

Figure 8:
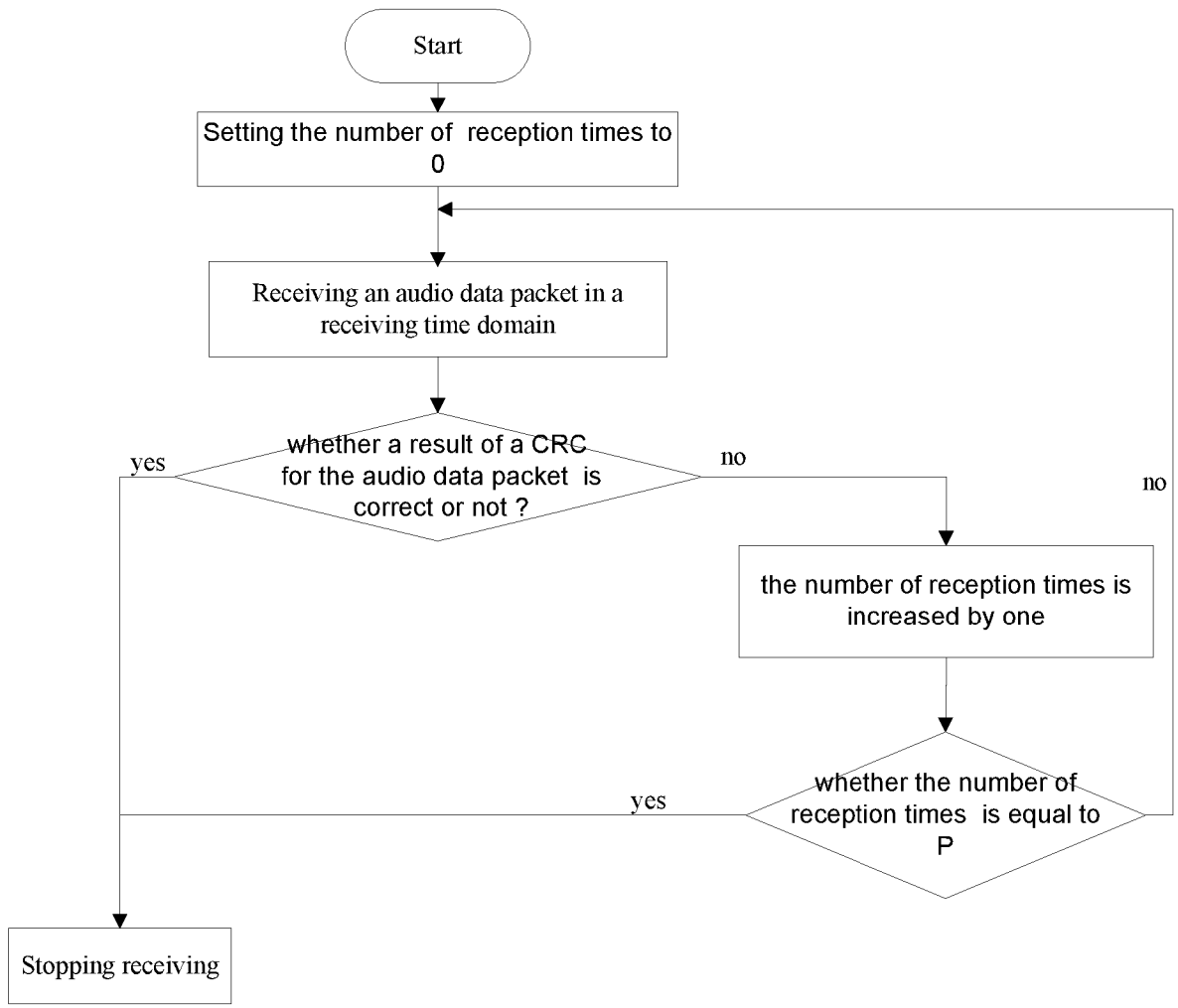
FIG. 8 is a receiving flow chart of the receiving device in one broadcast interval according to one embodiment of the present application.

The receiving process of the wireless broadcast receiving device in one broadcast interval is as shown in FIG. 8. The number of reception times is set to 0 at an anchor point of the broadcast interval, and then the broadcasted data transmitted by the wireless broadcast sound source device is sequentially received in the first time block. A CRC is performed on the received audio data. If the result of the CRC is correct, the receiving of the audio data in the broadcast interval is stopped and the received audio data is sent to the audio processor. If the result of the CRC is incorrect, the same audio data that is simultaneously transmitted in the same channel by the radio broadcast sound source devices or other radio broadcast receiving and forwarding devices at different locations, continues to be received in the next time block. If the number of reception times is equal to the total number of the time blocks (P), the receiving in the broadcast interval is ended, and the packet loss information is sent to the audio processor.

In order to solve the multipath delay spread problem of signals transmitted from devices (radio broadcast sound source devices or radio broadcast receiving and forwarding devices) at different spatial locations, the wireless broadcast sound source device and the radio broadcast receiving and forwarding device are configured to transmit the same signal on the same channel at the same time. The same data packet must be sent synchronously. For example, an error range is in 1 us. When the radio broadcast receiving and forwarding device and the radio broadcast receiving device demodulate the 2DH3 packet, an equalization technique can be used to solve the multipath delay spread problem.

In the audio communication system according to one embodiment of the present application, the sound source device transmits the audio data multiple times in the broadcast interval to improve reliability of receiving the audio data by the receiving device. The receiving and forwarding device also forward the audio data multiple times in the same broadcast interval after the audio data is received correctly, so that other blocked receiving and forwarding devices or receiving devices that cannot reliably receive the broadcast audio data can receive the audio data reliably, thereby improving the reliability of receiving the audio data by the receiving device in the audio communication system, or reducing dead space of the audio communication system.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. An audio data communication system comprising:
   a sound source device configured for broadcasting an audio data packet on a plurality of first time blocks in a first broadcast interval; and
   one or more receiving and forwarding devices, configured for receiving the audio data packet broadcasted by the sound source device and/or other receiving and forwarding devices on one or more second time blocks in a second broadcast interval, and forwarding the audio data packet on one or more third time blocks in the second broadcast interval after the audio data packet is received correctly, wherein the first broadcast interval is synchronously aligned with the second broadcast interval, and the aligned first and second broadcast intervals are used to transmit the same audio data packet.

2. The system according to claim 1, wherein the first broadcast interval comprises the plurality of first time blocks for broadcasting the audio data packet, and the plurality of first time blocks comprises one broadcast anchor time block for broadcasting one audio data packet and N broadcast retransmission time blocks for retransmitting the one audio data packet, where N is a positive integer.

3. The system according to claim 2, wherein the first broadcast interval further comprises: one or more fourth time block for receiving audio data packets from other devices, and/or transmitting synchronization information for synchronously aligning the first broadcast interval and the second broadcast interval.

4. The system according to claim 1, wherein one audio data packet comprises L frames of audio data encoded at fixed intervals, the first broadcast interval is L times the fixed interval, where L is a positive integer.

5. The system according to claim 1, wherein the second broadcast interval comprises:
   one or more second time blocks for receiving the audio data packet; and
   one or more third time blocks for forwarding the audio data packet after the audio data packet is received correctly, wherein a sum of the second time block and the third time block is less than or equal to the second broadcast interval.

6. The system according to claim 5, wherein the receiving and forwarding device includes:
   a first receiving module, configured to receive the audio data packet sent by the sound source device and/or other receiving and forwarding devices on the one or more second time blocks in the second broadcast interval;
   a first CRC check module, configured to perform a cyclic redundancy check on the received audio data packet;
   a sending module, configured to forward the audio data packet on the one or more third time blocks in the second broadcast interval; and
   a first determining module, configured to inform the first receiving module to continue or stop receiving the audio data packet in the second broadcast interval according to a result of the CRC, the number of reception times of the audio data packet, the number of the second time block and the number of the third time block; or inform the sending module to forward the audio data packet.

7. The system according to claim 6, wherein the first determining module is configured for:

informing the first receiving module to stop receiving the audio data packet in the second broadcast interval if the result of the CRC of the audio data packet is correct, increasing the number of used time block, determining whether the number of used time blocks is equal to M, and informing the sending module to forward the audio data packet on the one or more three time blocks in the second broadcast interval if the number of used time blocks is not equal to M, wherein M is the sum of the number of the second time blocks and the number of the third time blocks; and increasing the number of reception times of the audio data packet if the result of the CRC of the audio data packet is incorrect, determining whether the number of reception times of the audio data packet is equal to M, informing the first receiving module to continue receiving the audio data packet in the second broadcast interval when the number of reception times is not equal to M, and informing the first receiving module to stop receiving the audio data packet in the second broadcast interval when the number of reception times is equal to M.

8. The system according to claim 1 further comprising:

one or more receiving devices, configured to receive the audio data packet sent by the sound source device and/or other receiving and forwarding devices on one or more fifth time blocks in a third broadcast interval, wherein the first broadcast interval and the third broadcast interval are synchronously aligned, and the aligned first and third broadcast intervals are used to transmit the same audio data packet.

9. The system according to claim 8, wherein the receiving device comprises:

a second receiving module, configured to receive the audio data packet sent by the sound source device and/or other receiving and forwarding devices on one or more fifth time blocks in the third broadcast interval;

a second CRC check module, configured to perform a cyclic redundancy check CRC on the received audio data packet; and a second determining module is configured to inform the second receiving module to continue or stop receiving the audio data packet in the third broadcast interval according to a result of the CRC and a number of reception times of the audio data packet and the number of the fifth time blocks.

10. The system according to claim 9, wherein the second determining module is configured for:

informing the second receiving module to stop receiving the audio data packet in the third broadcast interval when the result of the CRC of the audio data packet is correct;

increasing the number of reception times of the audio data packet when the result of the CRC of the audio data packet is incorrect;

determining whether the number of reception times of the audio data packet is equal to P, wherein P is the number of the fifth time blocks in the third broadcast interval; and informing the third receiving module to continue receiving the audio data packet in the third broadcast interval when the number of reception times is not equal to P, and informing the first receiving module to stop receiving the audio data packet in the third broadcast interval when the number of receiving times is equal to P.

* * * * *